(12) United States Patent
Morovic et al.

(10) Patent No.: US 10,401,834 B2
(45) Date of Patent: Sep. 3, 2019

(54) GENERATING CONTROL DATA FOR SUB-OBJECTS (71) Applicants: Peter Morovic, Sant Cugat del Valles (ES); Jan Morovic, Colchester (GB); Juan Manuel Garcia Reyero Vinas, Sant Cugat del Valles (ES); HEWLETT-PACKARD DEVELOPMENT COMPANY, L.P., Houston, TX (US)

(72) Inventors: Peter Morovic, Sant Cugat del Valles (ES); Jan Morovic, Colchester (GB); Juan Manuel Garcia Reyero Vinas, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/539,832

(22) PCT Filed: Jan. 30, 2015

(86) PCT No.: PCT/EP2015/051945
§ 371 (c)(1),
(2) Date: Jun. 26, 2017

(87) PCT Pub. No.: WO2016/119883
PCT Pub. Date: Aug. 4, 2016

(65) Prior Publication Data
US 2017/0371318 A1 Dec. 28, 2017

(51) Int. Cl.
G05B 19/4099 (2006.01)
B29C 64/10 (2017.01)

(52) U.S. Cl.
CPC ......... *G05B 19/4099* (2013.01); *B29C 64/10* (2017.08); *G05B 2219/49036* (2013.01)

(58) Field of Classification Search
CPC ...... G05B 19/4099; G05B 2219/49036; B29C 64/10; B29C 67/0088; G06T 17/00; G06T 7/0012; G06T 15/08; B41J 29/393
(Continued)

(56) References Cited

U.S. PATENT DOCUMENTS 5,850,229 A * 12/1998 Edelsbrunner .......... G06T 13/20
345/473
6,480,301 B1 * 11/2002 Cholewo ............... G06T 11/001
358/1.9
(Continued)

FOREIGN PATENT DOCUMENTS

WO    WO-2014111707    7/2014

OTHER PUBLICATIONS

Edelsbrunner, Herbert, and Ernst P. Mücke. "Three-dimensional alpha shapes." ACM Transactions on Graphics (TOG) 13.1 (1994): 43-72. (Year: 1994).*

(Continued)

*Primary Examiner* — Brian W Wathen
*Assistant Examiner* — Alicia M. Choi
(74) *Attorney, Agent, or Firm* — HP Inc. Patent Department (57) ABSTRACT In an example, a method for generating control data for production of a three-dimensional object is described. A model of the three-dimensional object is obtained as a array of voxels, and it is determined for each voxel whether that voxel comprises part of a first or a second sub-object of the three-dimensional object. Each first sub-object voxel is mapped to a volume coverage representation defining print material data for that voxel. The second sub-object voxels are mapped to a volume coverage representation defining common print material data for the voxels of second sub-object. Control data for printing the first sub-object is (Continued)

generated from the print material data for that voxel common print material data for the Control data for printing the second sub-object is generated according to the volume coverage representation for the second sub-object.

15 Claims, 4 Drawing Sheets

(58) Field of Classification Search
    USPC .......................................................... 700/98
    See application file for complete search history.

(56) References Cited

U.S. PATENT DOCUMENTS

| | | |
|---|---|---|
| 8,660,825 B2 | 2/2014 | Kumar |
| 2004/0033085 A1* | 2/2004 | Misaizu .............. G03G 15/1605 399/130 |
| 2006/0235562 A1 | 10/2006 | Knoppers |
| 2007/0211070 A1* | 9/2007 | Stenson ................. G06T 15/04 345/587 |
| 2013/0095302 A1 | 4/2013 | Pettis |
| 2014/0277661 A1* | 9/2014 | Amadio .............. B29C 67/0088 700/97 |
| 2014/0297014 A1* | 10/2014 | Iverson .............. G05B 19/4099 700/98 |
| 2014/0336808 A1 | 11/2014 | Taylor |
| 2015/0109297 A1* | 4/2015 | Panteleev ............. G06T 15/005 345/424 |
| 2015/0293722 A1* | 10/2015 | Cudak ................. B29C 67/0088 358/1.15 |
| 2015/0381968 A1* | 12/2015 | Arora ...................... G06T 17/00 348/47 |
| 2016/0151979 A1* | 6/2016 | Urban ................ B29C 67/0092 264/308 |
| 2017/0178388 A1* | 6/2017 | Bisson .................... G06T 17/00 |
| 2017/0221238 A1* | 8/2017 | Limberger ............ G06T 11/206 |

OTHER PUBLICATIONS

Cornea, Nicu D., et al. "Computing hierarchical curve-skeletons of 3D objects." The Visual Computer 21.11 (2005): (Year: 2005).*
Mueller, et al; "Fast 3D Printing of Functional Objects by Integrating Construction Kit Building Blocks"; Apr. 26, 2014-May 1, 2014; http://www.academia.edu/6980375/faBrickation_Fast_3D_printing_of_Functional_Objects_by_Integrating_Construction_Kit_Building_Blocks.

* cited by examiner

GENERATING CONTROL DATA FOR SUB-OBJECTS

BACKGROUND

Three-dimensional objects generated by an additive manufacturing process are formed in a layer-by-layer manner. In one example of additive manufacturing, an object is generated by coalescing and solidifying portions of layers of build material. In examples, the build material may be in the form of a powder, fluid or sheet material. The intended coalescence, solidification and/or physical properties may be achieved by printing an agent onto a layer of the build material. Energy may be applied to a layer and build material which is coated with the agent coalesces and solidifies upon cooling. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, as well as the amount to be applied.

BRIEF DESCRIPTION OF DRAWINGS

For a more complete understanding, reference is now made to the following description taken in conjunction with the accompanying drawings in which.

DETAILED DESCRIPTION

Some examples described herein provide an apparatus and a method for generating control data that may be used to produce a three-dimensional object. Some examples allow arbitrary three-dimensional content with a variety of specified object properties to be processed and used to generate a three-dimensional object. These object properties may comprise appearance properties (color, transparency, glossiness, etc), conductivity, density, porosity and/or mechanical properties such as strength.

In some examples herein, three-dimensional space is characterised in terms of 'voxels', i.e. three-dimensional pixels, wherein each voxel occupies a discrete volume. When producing data modelling a three-dimensional object, a voxel at a given location may have at least one characteristic. For example, it may be empty, or may have a particular color, or may represent a particular material, or a particular object property, or the like. In some examples, voxels are analogous to addressable locations within an object to be generated.

In certain examples, data representing a three-dimensional object is processed to generate a volume coverage representation of at least a portion of the object. In some examples, the volume coverage representation defines print material data. Print material data may provide an indication of the amount of print material(s) (such as agents an agent to be printed onto a layer of build material, or in some examples, build materials themselves), and their combination(s) if needed, to be deposited at a particular location or region. Print material data may be specified as a proportional volume coverage (for example, X % of a region of a layer of build material should have agent Y applied thereto). Print materials could be related to or selected to provide object properties such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

In one example, a set of voxels describing an object may be associated with a set of material (or material combination) volume coverage (Mvoc) vectors. In a simple case, such an Mvoc vector may indicate that X % of a given region of three-dimensional space should have a particular agent applied thereto, whereas (100–X) % should be left clear of agent. The Mvoc vector(s) may then provide the input for a 'halftoning' process to generate control data that may be used by an additive manufacturing system to produce a three-dimensional object. For example, it may be determined that, to produce specified material properties, 25% of a layer of build material (or of a portion of a layer) should have a particular agent applied thereto. The halftoning process determines where drops of agent are to be deposited in order to provide 25% coverage, for example by comparing each location to a threshold value provided in a halftone threshold matrix.

In some examples, data representing a plane of a three-dimensional structure or object is 'rasterized', i.e. converted to series of discrete locations. The rasterized planes may be at the printable resolution of the three-dimensional printing apparatus to which control data may be provided.

Figure 1:
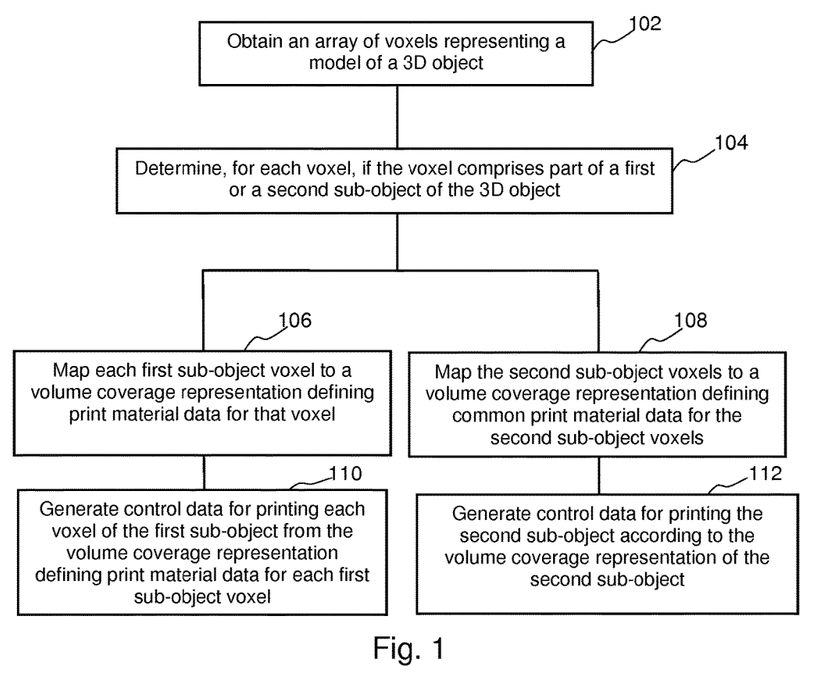
FIG. 1 is a flowchart of an example of a method for generating control data for production of a three-dimensional object.

FIG. 1 shows a method for generating control data for production of a three-dimensional object. In block 102, an array of voxels representing a model of a three-dimensional object is obtained. It is determined whether each voxel comprises part of a first or a second sub-object of the three-dimensional object (block 104). In some examples, the first sub-object is to be generated to a first standard and the second sub-object is to be generated to a second, standard, wherein the first standard is more exactly specified (i.e. has a higher specificity) than the second standard. In one example, the first sub-object comprises external regions of the object, which are to be represented at a high level of detail, and the second sub-object comprises internal regions of the sub-object, which may not be visible and therefore, in this example, the specificity for manufacture is reduced. However, the first and second sub-object may represent any portions of the object, and indeed there may be more than two sub-objects. In one example, the second sub-object may be defined as a triangulated surface. Some voxels may be determined to belong to neither the first or second sub-object, and/or to belong to another sub-object.

In some examples, the array of voxels representing the object may be processed to generate a rasterized representation of a plane of the three-dimensional model object. This therefore treats the model in a layer-wise manner, which is a suitable form for controlling an additive manufacturing apparatus which operates in a layer-wise manner. If such a representation has been generated, then voxels can be treated in effect as pixels.

In block 106, each first sub-object voxel (i.e. each voxel which was determined as comprising part of the first sub-object) is mapped to a volume coverage representation defining print material data at that voxel. A mapping may for example be based on object property data associated with that voxel.

In block 108, the voxels determined as comprising part of the second sub-object are all mapped to a volume coverage representation defining common print material data for the second sub-object. In some examples, this mapping may be based on object property data associated with at least one of the second sub-object voxels, for example contained within data describing the model of the three-dimensional object. In other examples, the volume coverage representation may be derived from a source other than object property data supplied with object model data, for example being a volume coverage representation which is stored in a memory, or generated to provide at least one object properties such as a particular object strength, color or the like.

In an example, this print material data may comprise one or several proportions of a set of available print materials, such as agents, (or their combinations), to be applied to form that voxel/sub-object. In another example, rather than mapping voxels to a volume coverage representation specifying all the print materials to be used, a coverage level for each print material may be determined separately. In some examples, the data may relate to a physical property associated with a print material. In some examples, the print material data may be based on information received regarding the object to be generated, and/or on 'global' properties such as the minimum amount of material to be present in a given volume to create an object having a specific characteristics, such as a minimum strength characteristic.

Control data is then generated for the first sub-object voxels (block 110). In an example, this may be carried out by comparing print material data for each first sub-object voxel and expressed as a volume coverage with a threshold value of a threshold matrix to generate control data for printing the first sub-object. In an example, a halftone threshold matrix contains an array of threshold values. In one example, the threshold values are for carrying out a halftone operation that compares a value of the threshold matrix against a value of a volume coverage representation and chooses a single 'state', i.e. a print material or print material combination based on the comparison. Such a matrix may be determined or predetermined in any way, for example and without limitation based on methods such as dithering, clustering, void and cluster, error diffusion, green noise type distributions, and the like.

Control data is generated according to the volume coverage representation for the second sub-object (block 112). In some examples, a volume of control data suitable for providing the volume coverage specified for the second sub-object is created (this can be considered as creating control data to generate an arbitrary object having a volume which is at least the volume of the second sub-object), then the intersection of this data and the second sub-object volume is used to provide control data to generate the second sub-object. Examples of control data generation methods for the second sub-object are described in relation to FIGS. 2 and 3.

The sub-objects are thereby processed differently: the control data for the first sub-object is determined in a point by point (voxel by voxel) manner. However, the voxels of the second sub-object are treated in a consolidated, or volumetric, manner. Considered another way, the second sub-object is processed as a whole, rather than point by point. In some examples, object property data associated with voxels of the first sub-object is used to generate control data for the first sub-object, but the object property data for the second sub-object voxels may not be used, or may not be used for each voxel. In one example, the print material data for the first sub-object may vary over the first sub-object volume (i.e. it may, depending on for example object property data, be different for different voxels), whereas the print material data of the second sub-object is common to the whole sub-object volume. Processing demands for the second sub-volume may thereby be less than for the first sub-volume. This may result in a saving of time and/or resources.

In other examples, there may be any number of sub-objects, which may be treated volumetrically or in voxel-by-voxel manner.

As described in relation to block 104, voxels may be determined to comprise part of a first or second sub-object. In some examples, the voxels may be associated with a data tag indicated whether they belong to the first or the second sub-objects. For example, the voxels may be an output of a three-dimensional design software, such as a Computer Aided Design (CAD) application. A region of the object may have been tagged, for example by a user or by some analytic process. In such cases, determining comprises reading such tags.

In other examples, however, determining the sub-object to which a voxels belongs may comprise analysing the object. In one example, this may comprise identifying the largest volume on the interior of the object which may be mapped to a particular constant material volume coverage (i.e. common material properties are to be applied across the volume, which need not be continuous), as this can be taken as an indication that the original design of the object did not intend that detailed attention be paid to this region. The interior can be differentiated from the exterior by identifying populated voxels for which all neighbouring voxels are also populated. In another example, the second sub-volume may be identified as an 'interior core', for example to distinguish it from an 'exterior shell' portion. In such examples, the interior core could be determined as a smaller proportional scaling of the object as a whole, or by considering inscribed 'alpha shapes' to define a convex hull. In another example, a repulsive force function (which models the theoretical effect of placing an electrical charge on the outer surface of the object to identify the location of the object's central skeleton) could be used.

Figure 2:
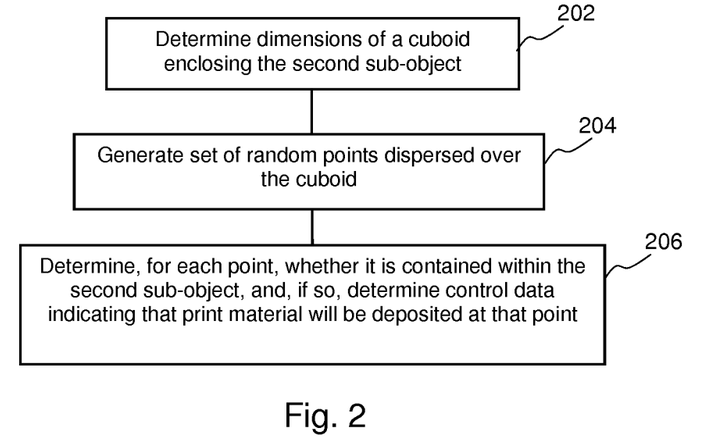
FIG. 2 is a flowchart of an example of a method for generating control data for a sub-object of the three-dimensional object.

FIG. 2 shows an example of the process of block 112 in greater detail. In block 202, the dimensions of a cuboid enclosing the second sub-object are determined. A set of random points dispersed over the cuboid is generated (block 204). The number of generated points may be determined according to the volume coverage representation of the second sub-object and the resolution of an apparatus for generating the object. By way of example, assume the second sub-object is to be printed with a 20% probability of a single drop of agent A being placed in a particular location. The number of points to be generated can be computed from the number of layers to be printed and the print resolution. For example, if the object is printed in 100 layers and each layer is printed at 600 dpi resolution then the total number of addressable points for the enclosing cuboid can be determined, and 20% of that number is determined as the number of points. It may be that the precise number of points is not pivotal, and an approximation, for example pre-computed for a range of volume coverage values, may be used.

In some examples, a combination of print materials may be used. In such examples, the random samples may be random in their location and also in their contone value. The contone value may for example be generated as a volume-coverage (probability) weighted random index. For example, if two agents/inks are used with 15% probability for the first and 5% probability of the second, then a single, 20% white-noise random distribution of points may be generated such that ¾ of these points are associated with the first and ¼ are associated with the second. In this way, a single set of randomly generated points can be split between multiple print materials, instead of having to generate per-agent sets of points, where there may be interference between the two sets.

In block 206, it is determined, for each point, whether the point is contained within the second sub-object. In mathematical terms, this comprises determining the intersection of the array of points and the array of voxels/addressable locations making up the second sub-object. For each point which is contained within the volume of second sub-object, control data indicating that at least one agent will be deposited at that point is determined.

This effectively provides a pre-computed 'halftone' treatment for the second sub-object volume, without requiring each pixel/voxel to be halftoned (for example by being compared to a threshold value). If the data is determined in relation to a three-dimensional volume, when printing in a layer-wise manner, the halftone can effectively be quantised by 'snapping' values to the layers (e.g. for layer 42, where z=42, it will contain all points whose z-coordinate is within some threshold of 42).

Figure 3:
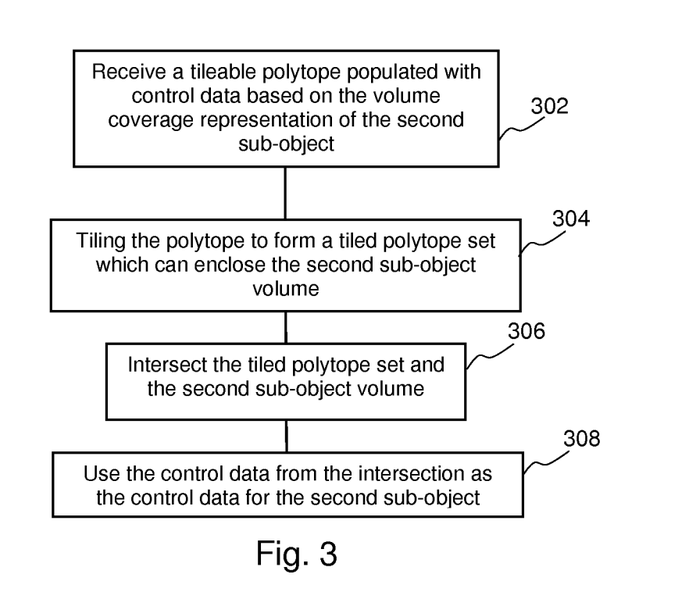
FIG. 3 is a flowchart of another example of a method for generating control data for a sub-object of the three-dimensional object.

Another example of a process for carrying out block 112 is described in FIG. 3. In block 302, a tileable polytope (for example a cuboid, or tetrahedron or the like) is generated which contains control data resulting in the proportions of print materials specified for the second sub-object (i.e. is based on the print material data which is common to all second sub-object voxels). For example, 20% of the addressable locations of the polytope may be populated to indicate that an agent should be deposited in that location. The polytope may be a space-filling polytope (i.e. may be stacked or tiled without leaving spaces between polytopes). Such polytopes are then tiled such that the tiled polytope set can enclose the second sub-object volume (block 304). This 'stacked polytope' volume may then be intersected with the second sub-object volume (block 306). Where they overlap, the control data from the polytope set is used to provide control data for the same locations in the second sub-object volume, effectively 'populating' the second sub-object volume with control data.

The methods of both FIG. 2 and FIG. 3 allow control data to be allotted to the second sub-object on a 'volumetric' basis, rather than carrying out point by point thresholding against a threshold matrix as may be carried out for the first sub-volume. Instead, sufficient control data is generated to print the second sub-object volume in its entirety, and then this data (in some examples, a portion thereof) is used as the control data to print the second sub-object.

As mentioned above, in some examples, the first sub-object may be a shell, or outer (and possibly visible) portion of the object. The shell of an object may be intended to have properties such as color, gloss, granularity/smoothness, etc., while in an example, the interior is not specified as having any of these properties. It may instead have fewer specifications, which may be shared over a larger volume, such as an overall specification for the entire object to be of a certain rigidity/flexibility.

Figure 4:
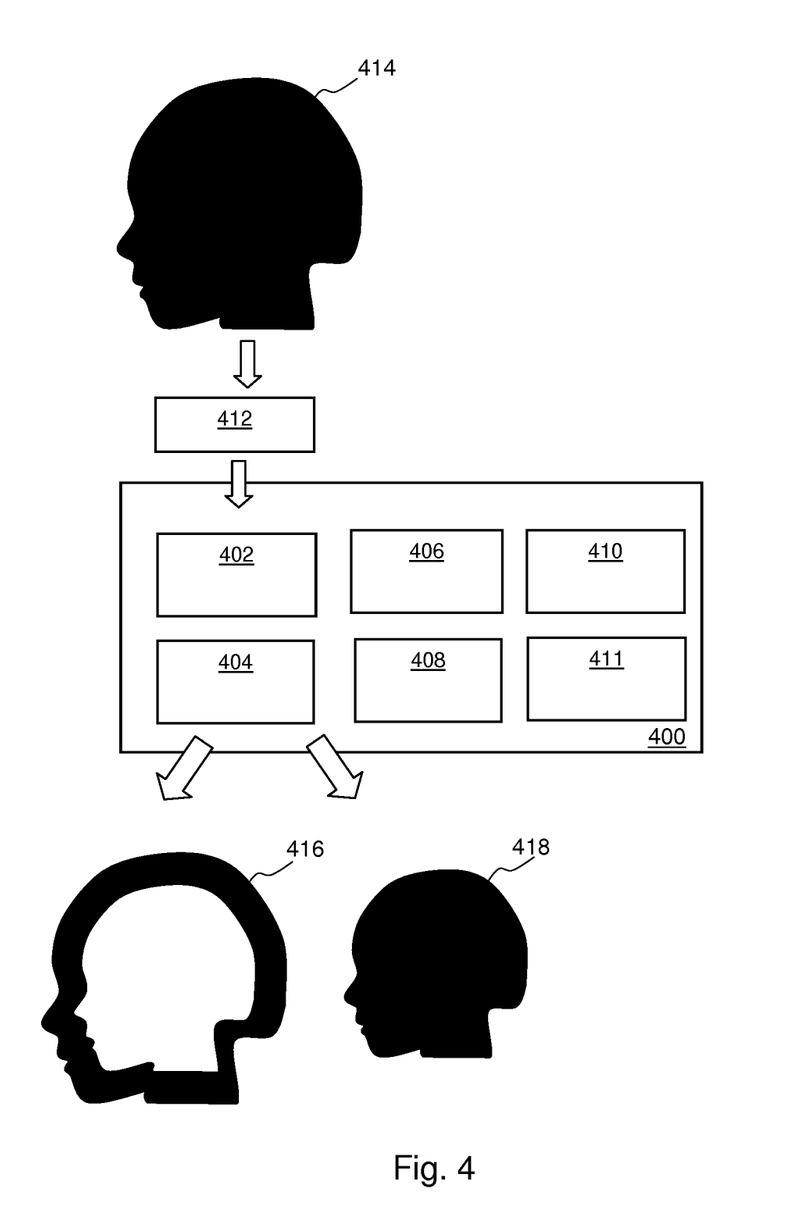
FIG. 4 is a simplified schematic of an example of apparatus for generating control data for production of a three-dimensional object.

FIG. 4 is a representation of an apparatus 400 to generate control data for production of a three-dimensional object. The apparatus 400 comprises an interface 402, a classifying module 404, a mapping module 406, a halftoning module 408, and a control data assigning module 410. The apparatus 400 in this example further comprises an image processor 411.

The interface 402 receives data 412 representing a model 414 of the three-dimensional object as an array of voxels. In the example of the figures, the model 414 is a model of a human head. The data 412 may for example define the shape and extent of all or part of an object in a three-dimensional co-ordinate system, e.g. the solid portions of the object, and may be generated by a computer aided design (CAD) application. It may be made up of data defining a three-dimensional model of at least a portion of the model object 414 and associated property data defining at least one object property for the three-dimensional object to be generated. Such object property data may comprise any combination of color, flexibility, elasticity, rigidity, surface roughness, porosity, inter-layer strength, density, conductivity and the like for at least a portion of the object to be generated, and may depend on the type of build material or agents used to generate an object. The object property data may comprise other material properties for at least a portion of the object to be generated and may be defined, for example, for the whole of an object to be generated, e.g. global property data, or for one or multiple portions of an object to be generated, e.g. local property data. Such object property data be used to define multiple object properties for a portion or portions of an object.

In one example, the data 412 may comprise voxels that are defined in a three-dimensional (also referred to herein as [x,y,z]) space. A given voxel may have associated data that indicates whether a portion of the model object 414 is present at that location. As described above, the object property data may comprise at least one of global and local object property data, e.g. certain object property values as defined in the object property data may be associated with each voxel that defines the object and/or certain object property values may be associated with a set of voxels, e.g. ranging from individual voxels to all voxels associated with the object. In one example, the data representing the three-dimensional object comprises a model of a three-dimensional object that has at least one material property specified at every location within the model, e.g. at every [x, y, z] co-ordinate.

The classifying module 404 characterises the voxels as comprising part of a first or a second sub-object of the three-dimensional object. In this example, the object is classified into sub-objects comprising an outer shell 416 and an interior core 418, wherein the interior core 418 is a scaled version of the model itself.

The mapping module 406 maps each voxel of the first sub-object, i.e. the outer shell 416, to a volume coverage representation defining print material data at each voxel. The mapping module 406 also maps the second sub-object voxels (i.e. those representing the interior core 418) to a volume coverage representation defining common print material data for the second sub-object voxels. In some examples, the mapping of the first sub-object voxels may be based on object property data associated with that voxel. The mapping of the second sub-object voxels may be based on common object property data which may, in some example be based on or derived from object property data associated with at least one sub-object voxel, or determined in some other way, such as being retrieved from a memory. In other examples, the print material data/volume coverage representation for the second sub-object may be predefined.

Print material data may for example be expressed as at least one proportion of a set of available print materials at the location, and may be Mvoc vector object. Such an Mvoc vector may have a plurality of values, wherein each value defines a proportion for each material or their combinations (a "material primary" or MP) in an addressable area of a layer of the three-dimensional object. For example, in an additive manufacturing system with two available materials—M1 and M2, where each material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sums to 1 or 100%.

In this example, an Mvoc vector is the same for the entire second sub-object (the interior core 418).

The halftoning module 408 in this example compares the print material data for each voxel of the first sub-object with a threshold value of the threshold matrix to generate control data for printing the first sub-object. Such a matrix may be predetermined in any way, for example and without limitation based on methods such as dithering, clustering, void and cluster, error diffusion, green noise type distributions, etc.

The control data assigning module 410 generates and assigns control data for the second sub-object. In one example, the control data assigning module 410 generates a volume of control data which would result in an object volume having the properties resulting from the volume coverage representation of the second sub-object, which defines common print material data for all the voxels of the second sub-object. This volume of control data may be intersected with the second sub-object to provide control data for generating the second sub-object. Viewed in another way, the control data assigning module 410 may generate control data for generating an arbitrary object having a volume which is at least the volume of the second sub-object, and using a portion of this control data as the control data for generating the second sub-object. Examples of control data assigning modules 410 are described in relation to FIGS. 5 and 6 below.

The apparatus 400 of FIG. 4 further comprises an image processor 411. In some examples, the operations may be carried out in relation to three-dimensional data. However, in this example, the image processor 411 accesses the data 412 representing the model and generate a rasterized representation of a plane of the three-dimensional model object 414. For example, the image processor 411 may generate slices of parallel planes of a model of the three-dimensional object which are then rasterized.

Each slice may relate to a portion of a respective layer of build material in an additive manufacturing system. In a three-dimensional space that uses a three-coordinate system, e.g. that uses [x, y, z] co-ordinates, these parallel planes may be z-slices, planes that are parallel to x and y axes. Each z-slice may comprise portion(s) of a model that have a common z co-ordinate and that extend in the x and y dimensions. The number of z-slices may depend on a resolution of detail in the z dimension and/or the output resolution of a layer of build material.

In one example, the image processor 411 outputs a plurality of two-dimensional raster objects, each representing a plane of the three-dimensional space in which the model object 414 is defined. Each of these two-dimensional raster objects may comprise an image such as a bitmap. In some examples, the mapping module 406 associates at least one Mvoc vector with each location in the raster object. For example, each raster object may comprise a set of pixels that extend in the x and y dimensions; each pixel may then be associated with at least one Mvoc value. In one case, each pixel may be associated with at least one material property. In the case that one of the material properties defines a color, the color may be defined in a color space, such as: a monochrome contone space, e.g. grayscale; a Red, Green, Blue (RGB) color space; the International Commission on Illumination (CIE) 1931 XYZ color space, wherein three variables ('X', 'Y' and 'Z' or tristimulus values) are used to model a color; the CIE 1976 (L*, a*, b*—CIELAB or 'LAB') color space, wherein three variables represent lightness ('L') and opposing color dimensions ('a' and 'b'); or any other color space or derived color space. A color value in these color spaces may comprise a continuous tone value, e.g. a value within a predefined range of values. For example, in a simple case, an RGB color value may comprise three 8-bit values; as such each red, green and blue value may be within the range of 0 to 255. Material properties may be defined implicitly and/or explicitly and may comprise at least one of, amongst others: a value indicating an available build material is to be used; a flexibility value; an elasticity value; a rigidity value; a surface roughness value; a porosity value; a strength value; and a density value. For example, a direct or explicit definition may be of the form "place X % of material Y, Z % of material Q, . . . ". An indirect or implicit definition may specify a particular material property, e.g. a color of X or a rigidity of Y and result in a mapping to an explicit combination of available materials.

In such examples, the voxels are processed in a manner similar to pixels. However, as the layers produced by and additive manufacturing apparatus have a thickness, each data point in the control data relates to a volume in space (i.e. a voxel).

Figure 5:
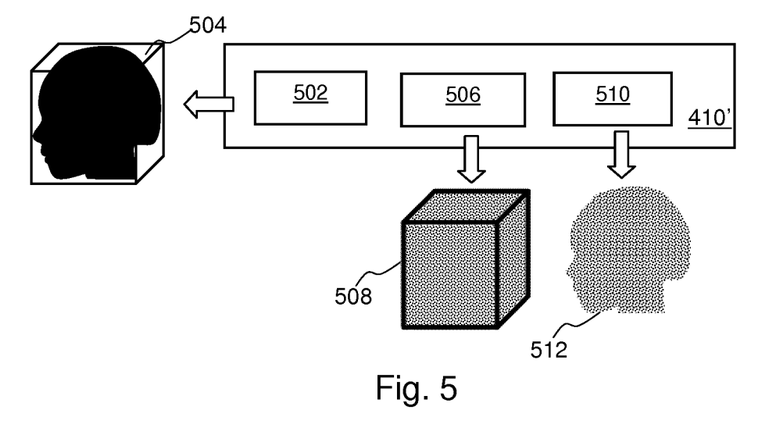
FIGS. 5 and 6 are examples of a module of the apparatus of FIG. 4 for generating control data for production of a three-dimensional object.

A first example of a control data assigning module 410 is described in FIG. 5.

In the example of FIG. 5, the control data assigning module 410' comprises a volume generator 502 to generate a cuboid 504 capable of enclosing the second sub-object volume. The module 410' further comprises a random point generator 506 to generate a set of random points dispersed over the cuboid, wherein the number of generated points is determined according to the volume coverage representation, for example as described above in relation to FIG. 2. This results in control data which could be used to generate the cuboid volume 508. The control data module 510 assigns control data indicating that at least one print material will be deposited for each point contained within the second sub-object, thus using a portion of the control data as control data to generate the second sub-object 512.

Figure 6:
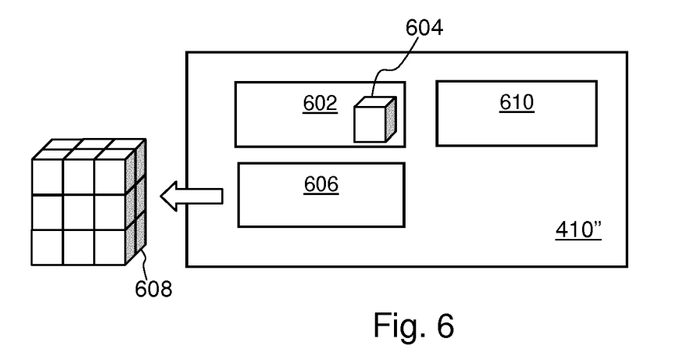

A second example of a control data assigning module 410 is described in FIG. 6. The control data assigning module 410" comprises a memory 602 storing at least one tileable polytope 604 (in this example, a cube). The polytope 604 is populated with control data for controlling an additive manufacturing apparatus to generate an object according to the volume coverage representation specified for the second sub-object. There may be several such polytopes held in the memory 602, for example having different base forms or shapes, or to specify different volume coverages of print materials.

The control data assigning module 410" further comprises a stacking module 606 to stack tileable polytopes 604 to provide a polytope set 608 which can contain the second sub-object volume. An intersecting module 610 is also provided to intersect the tiled polytope set and the second sub-object volume, and to use the control data in the region of the intersection as the control data to generate the second sub-object volume.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and modules described may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed or provided by a single processor or divided amongst several processors.

Figure 7:
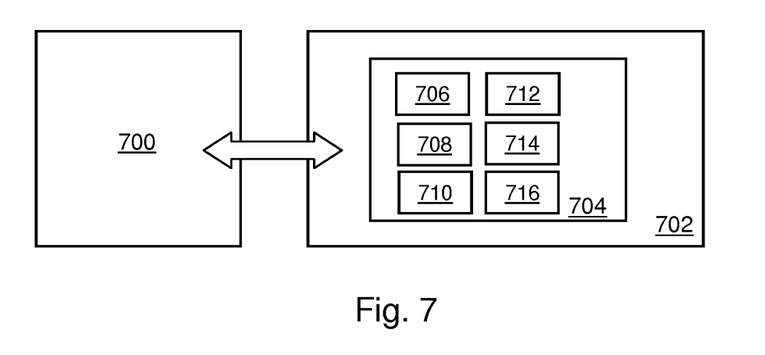
FIG. 7 is a simplified schematic of an example of a processor and a memory.

FIG. 7 shows an example of a processor 700 associated with a memory 702. The memory comprises computer readable instructions 704 which are executable by the processor 700. The instructions 704 comprise:

Instructions 706 to classify voxels of a representation of a three-dimensional object as representing a first or a second sub-object;

Instructions 708 to map each first sub-object voxel to a volume coverage representation defining print material data at each voxel, the mapping being carried out on a voxel-by-voxel basis;

Instructions 710 to map the second sub-object voxels to a volume coverage representation defining common print material data for the voxels of second sub-object;

Instructions 712 to generate control data for generating the first sub-object by halftoning the volume coverage representation of the first sub-object;

Instructions 714 to generate control data for generating an arbitrary object according to the volume coverage representation of the second sub-object, wherein the volume of the arbitrary object is at least the volume of the second sub-object; and Instructions 716 to use the control data for the arbitrary object as control data to generate the second sub-object.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a future or block from one example may e combined with or substituted by a feature/block of another example The word "comprising" does not exclude the presence of elements other than those listed in a claim, "a" or "an" does not exclude a plurality, and a single processor or other unit may fulfil the functions of several units recited in the claims.

Features described in relation to one example may be combined with or replaced by those of another example.

The features of any dependent claim may be combined with the features of any of the independent claims or other dependent claims.

The invention claimed is:

1. A method of generating control data for production of a three-dimensional object comprising:
   obtaining an array of voxels representing a model of the three-dimensional object;
   determining for each voxel if the voxel comprises part of a first or a second sub-object of the three-dimensional object,
   mapping each first sub-object voxel to a volume coverage representation defining print material data for that voxel;

mapping the second sub-object voxels to a volume coverage representation defining common print material data for the second sub-object voxels as a whole;

generating control data for printing each voxel of the first sub-object from the volume coverage representation defining print material data for each first sub-object voxel; and generating control data for printing the second sub-object according to the volume coverage representation of the second sub-object by:

determining the dimensions of a cuboid enclosing the second sub-object;

generating a set of random points dispersed over the cuboid, wherein a number of generated points is determined using the volume coverage representation of the second sub-object and the resolution of an apparatus to generate the object; and determining, for each point, whether that point is contained within the second sub-object and, if so, determining control data indicating that print material will be deposited at that point.

2. A method according to claim 1 wherein the first sub-object is to be generated to a higher specificity than the second sub-object.

3. A method according to claim 1 wherein the first sub-object comprises an external region of the object and the second sub-object comprises an internal region of the object.

4. A method according to claim 1 in which determining if a voxel comprises part of a first or a second sub-object of the three-dimensional object comprises identifying a largest volume on the interior of the object which is mappable to a particular, constant, volume coverage representation.

5. A method according to claim 1 in which the determining if a voxel comprises part of a first or a second sub-object of the three-dimensional object comprises determining the identity of a tag associated with each voxel.

6. A method according to claim 1 in which:
the determining if a voxel comprises part of a first or a second sub-object of the three-dimensional object comprises determining an interior core as a proportional scaling of the object; and the voxels in the interior core are determined to be part of the second sub-object.

7. A method according to claim 1 comprising processing the array of voxels to generate a rasterized representation of a plane of the three-dimensional object.

8. A method according to claim 1 in which:
the determining if a voxel comprises part of a first or a second sub-object of the three-dimensional object comprises determining an interior core using alpha shapes to define a convex hull; and
the voxels in the interior core are determined to be part of the second sub-object.

9. A method according to claim 1 in which:
the determining if a voxel comprises part of a first or a second sub-object of the three-dimensional object comprises determining an interior core using a repulsive force function; and
the voxels in the interior core are determined to be part of the second sub-object.

10. A method according to claim 1 in which the print material data indicates a proportional volume coverage.

11. A method according to claim 1 in which a set of objects describing the three-dimensional object is associated with a set of material volume coverage vectors.

12. A method according to claim 1 in which the determining for each voxel if the voxel comprises part of a first or a second sub-object comprises determining a voxel comprises a part of the second sub-object when all neighboring voxels are populated with print material.

13. Apparatus to generate control data for production of a three-dimensional object comprising:

an interface to receive data representing a model of the three-dimensional object as an array of voxels;

a classifying module to classify the voxels as comprising part of a first or a second sub-object of the three-dimensional object;

a mapping module to map each first sub-object voxel to a volume coverage representation defining print material data at each first sub-object voxel, and to map the second sub-object voxels to a volume coverage representation defining common print material data for the second sub-object voxels as a whole;

a halftoning module to halftone the first sub-object volume coverage representation to generate control data for printing the first sub-object; and a control data assigning module to generate control data for the second sub-object according to the volume coverage representation of the second sub-object, the control data assigning module comprises:

a volume generator to determine dimensions of a cuboid enclosing the second sub-object;

a random point generator to generate a set of random points dispersed over the cuboid, wherein a number of generated points is determined using the volume coverage representation of the second sub-object and a resolution of an apparatus to generate the object; and a control data module to determine, for each point, whether that point is contained within the second sub-object and, if so, determining control data indicating that print material will be deposited at that point.

14. An apparatus according to claim 13 further comprising:

an image processor to generate a rasterized representation of a plane of the three-dimensional model object.

15. A non-transitory computer readable storage medium encoded with instructions, executable by a processor, comprising:

instructions to classify voxels of a representation of a three-dimensional object as representing a first or a second sub-object based on a desired level of detail;

instructions to map each first sub-object voxel to a volume coverage representation defining an amount of print material at that voxel on a voxel-by-voxel basis;

instructions to map the second sub-object voxels as a whole to a volume coverage representation defining an amount of common print material for the voxels of the second sub-object;

instructions to generate control data for generating the first sub-object, the control data being generated from the volume coverage representation of the first sub-object; and instructions to generate control data for generating the second sub-object according to the volume coverage representation of the second sub-object by:

determining the dimensions of a cuboid enclosing the second sub-object;

generating a set of random points dispersed over the cuboid, wherein a number of generated points is determined using the volume coverage representation of the second sub-object and the resolution of an apparatus to generate the object; and determining, for each point, whether that point is contained within the second sub-object and, if so, determining control data indicating that print material will be deposited at that point.

\* \* \* \* \*

UNITED STATES PATENT AND TRADEMARK OFFICE
CERTIFICATE OF CORRECTION

PATENT NO. : 10,401,834 B2  
APPLICATION NO. : 15/539832  
DATED : September 3, 2019  
INVENTOR(S) : Peter Morovic et al.

It is certified that error appears in the above-identified patent and that said Letters Patent is hereby corrected as shown below:

On the Title Page

On page 2, Column 1, item (57), Abstract, Lines 1-2, delete "that voxel common print material data for the" and insert -- each first sub-object voxel. --, therefor.

Signed and Sealed this  
Twenty-sixth Day of November, 2019

Andrei Iancu  
*Director of the United States Patent and Trademark Office*